United States Patent [19]

Bodai

[11] 4,347,983

[45] * Sep. 7, 1982

[54] HYPERBOLIC FREQUENCY MODULATION RELATED TO AERO/HYDRODYNAMIC FLOW SYSTEMS

[75] Inventor: Conrad A. Bodai, Davis, Calif.

[73] Assignee: Sontek Industries, Inc., Dallas, Tex.

[*] Notice: The portion of the term of this patent subsequent to Feb. 23, 1999, has been disclaimed.

[21] Appl. No.: 110,670

[22] Filed: Jan. 9, 1980

Related U.S. Application Data

[63] Continuation-in-part of Ser. No. 4,818, Jan. 19, 1979, Pat. No. 4,253,508.

[51] Int. Cl.$^3$ .......................... B05B 1/34; B05B 17/06
[52] U.S. Cl. ................................ 239/466; 239/543; 239/545
[58] Field of Search ............... 239/101, 102, 461, 463, 239/468, 486, 487, 466, 490–497, 543–545; 261/DIG. 39, DIG. 48, DIG. 55, DIG. 78

[56] References Cited

U.S. PATENT DOCUMENTS

| | | |
|---|---|---|
| 1,416,995 | 5/1922 | Stroud . |
| 1,729,382 | 9/1929 | Harel . |
| 1,752,506 | 4/1930 | Portail . |
| 1,939,302 | 12/1933 | Heaney ................... 261/1 |
| 2,014,907 | 9/1935 | Myers ................... 261/79 R |
| 2,273,979 | 2/1942 | Mock ................... 261/1 |
| 2,360,628 | 10/1944 | Wright . |
| 2,364,987 | 12/1944 | Lee ................... 261/78 R |
| 2,453,595 | 11/1948 | Rosenthal . |
| 2,536,832 | 1/1951 | Autorfer ................... 239/468 |
| 2,687,780 | 8/1954 | Culhane . |
| 2,791,994 | 5/1957 | Grieb . |
| 2,808,012 | 10/1957 | Schindler . |
| 2,968,147 | 1/1961 | Truly, Jr. et al. |
| 2,968,305 | 1/1961 | Barnett . |
| 3,095,369 | 6/1963 | Jager . |
| 3,143,401 | 8/1964 | Lambrecht . |
| 3,227,202 | 1/1966 | Morgan . |
| 3,292,635 | 12/1966 | Kolodny ................... 131/10.5 |
| 3,303,850 | 2/1967 | Parrigin ................... 131/182 |
| 3,323,550 | 6/1967 | Lee ................... 138/39 |
| 3,332,231 | 7/1967 | Walsh . |
| 3,336,017 | 8/1967 | Kopa ................... 261/128 |
| 3,376,027 | 4/1968 | Kopa ................... 261/145 |
| 3,395,899 | 8/1968 | Kopa ................... 261/22 |
| 3,459,162 | 8/1969 | Burwinkle et al. ................... 123/122 |
| 3,496,919 | 2/1970 | Gerrard ................... 123/122 |
| 3,519,407 | 7/1970 | Hilborn . |
| 3,525,345 | 8/1970 | Harris ................... 131/261 |
| 3,539,157 | 11/1970 | Fort ................... 261/34 |
| 3,554,443 | 1/1971 | Hughes ................... 239/102 X |
| 3,590,827 | 7/1971 | Brudy et al. ................... 131/261 |
| 3,685,808 | 8/1972 | Bodai ................... 261/1 |
| 3,724,763 | 4/1973 | Braun ................... 239/490 |
| 3,730,160 | 5/1973 | Hughes ................... 261/1 X |
| 3,756,575 | 9/1973 | Cottell ................... 261/1 |
| 3,762,385 | 10/1973 | Hollnagel ................... 123/122 A |
| 3,787,168 | 1/1974 | Koppang et al. ................... 431/354 |
| 3,847,125 | 11/1974 | Malherbe ................... 123/119 E |
| 3,857,375 | 12/1974 | Jackson ................... 123/141 |
| 3,860,173 | 1/1975 | Sata ................... 239/102 |
| 3,861,852 | 1/1975 | Berger ................... 239/102 X |
| 3,885,902 | 5/1975 | Fujieda et al. ................... 239/102 X |
| 3,907,940 | 9/1975 | Thatcher ................... 239/102 X |
| 3,914,953 | 10/1975 | Cherry ................... 261/DIG. 39 X |
| 3,961,633 | 6/1976 | Schubert et al. ................... 131/94 |
| 3,976,726 | 8/1976 | Johnson ................... 261/1 |
| 4,029,064 | 6/1977 | Csaszar et al. ................... 261/DIG. 48 X |
| 4,034,025 | 7/1977 | Martner ................... 261/DIG. 48 X |
| 4,038,348 | 7/1977 | Kompanek . |
| 4,079,714 | 3/1978 | Saito . |
| 4,099,504 | 7/1978 | Bickhauss . |
| 4,100,896 | 7/1978 | Thatcher et al. |
| 4,105,004 | 8/1978 | Asai et al. |
| 4,106,459 | 8/1978 | Asai et al. |

FOREIGN PATENT DOCUMENTS

| | | |
|---|---|---|
| 389785 | 6/1921 | Fed. Rep. of Germany .... 261/79 R |
| 440085 | 12/1967 | Switzerland . |
| 1103823 | 2/1968 | United Kingdom . |

OTHER PUBLICATIONS

"A Vortex Whistle", B. Vonnegut, *Journal of the Acoustical Society of America*, vol. 26, No. 1, Jan. 1954.

*Sonics*, Hueter and Bolt, John Wiley and Sons, Inc., New York, London, 1955.

*Acoustical Engineering*, H. F. Olson, Van Nostrand Co., Inc., Princeton, N. J., 1957.

*Acoustic Coagulation and Precipitation of Aerosols*, Mednikov, Consultants Bureau, New York, 1965.

Yankee Oilman, Jan. 1977, issue (Annual Oilheat Issue), pp. 10 and 11.
Specification for Carlin, "CRD" Oil Burners, Models 100CRD, and 101CRD, The Carlin Co., Wethersfield, Conn. 06109.
Sources of High-Intensity Ultrasound, vol. 1, Plenum Press, New York, 1969, pp. 72-77.
Ultrasonics, The Low and High-Intensity Applications, Ensminger, D., Marcel Dekker, Inc., New York, 1973, pp. 467-471.
Ultrasonics in the Chemical Industry, Soviet Progress in Applied Ultrasonics, vol. 2, Nosov, 1965, p. 19.
Introduction to Geometrical and Physical Optics, McGraw-Hill Book Co., Inc., 1953, pp. 177 et seq.

*Primary Examiner*—Andres Kashnikow

[57] ABSTRACT

A device is disclosed which is capable of generating turbulence in a fluid as well as a sonic or ultrasonic field of predetermined frequency comprising a swirl chamber which is in fluid communication with a compression chamber and followed downstream by modulator cavities. Each successive stage of the device can alter the frequency and amplitude of the waves produced and in certain embodiments can act to intensify the vortices created in the fluid passing through the device to produce both mold controlled turbulence as well as stable high frequency/high amplitude acoustic (sonic or ultrasonic) vibration at the exit port.

28 Claims, 18 Drawing Figures

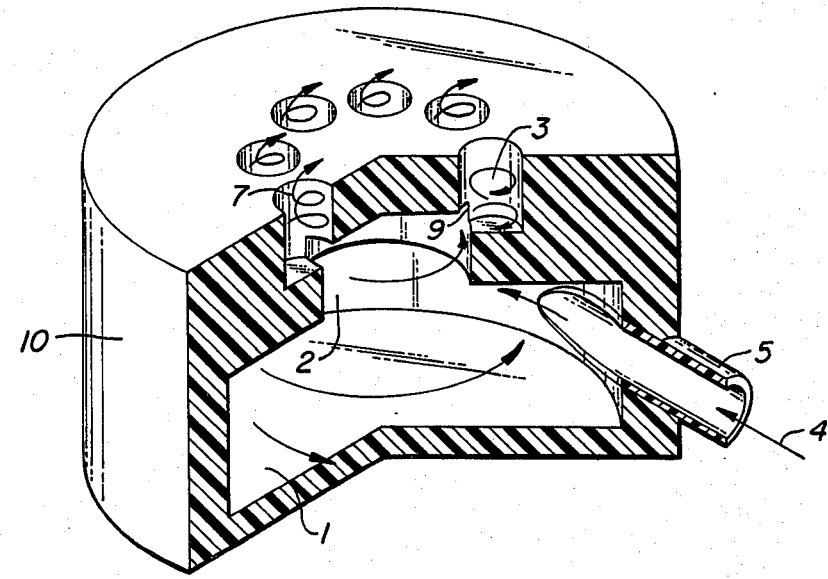
FIG._1.
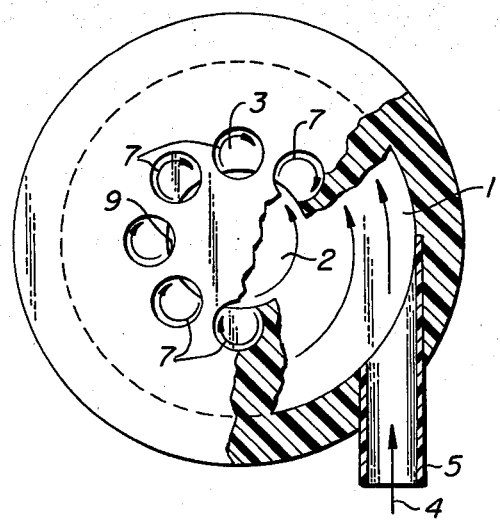
FIG._2.

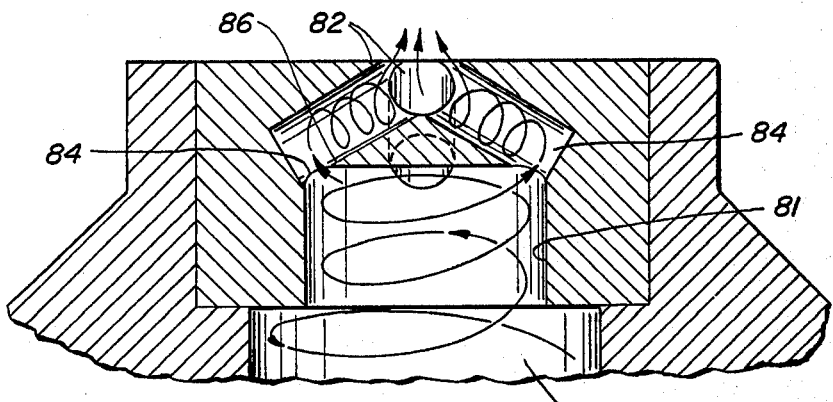
FIG._7.
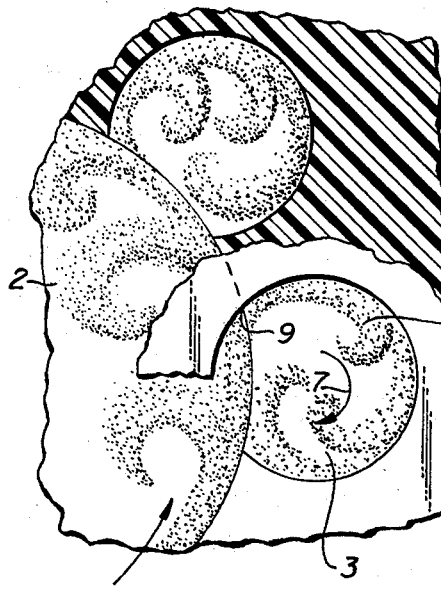
FIG._3A.
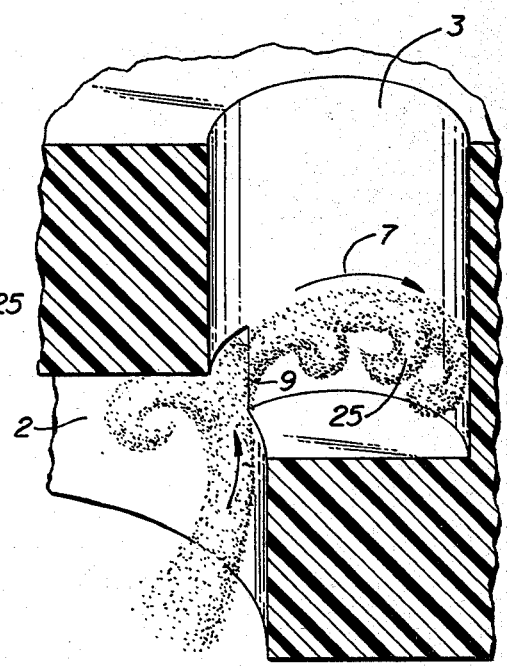
FIG._3B.

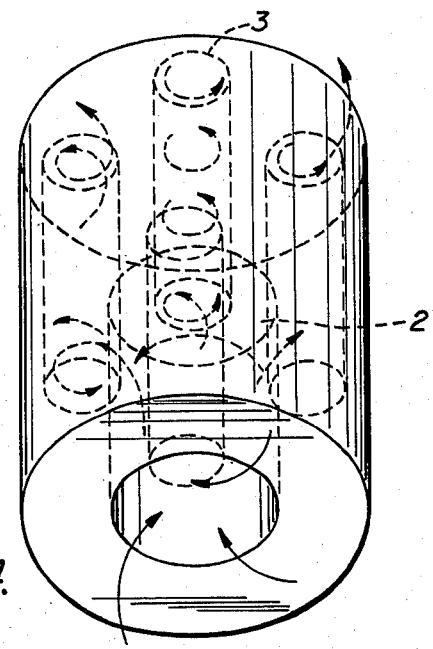
FIG._4.
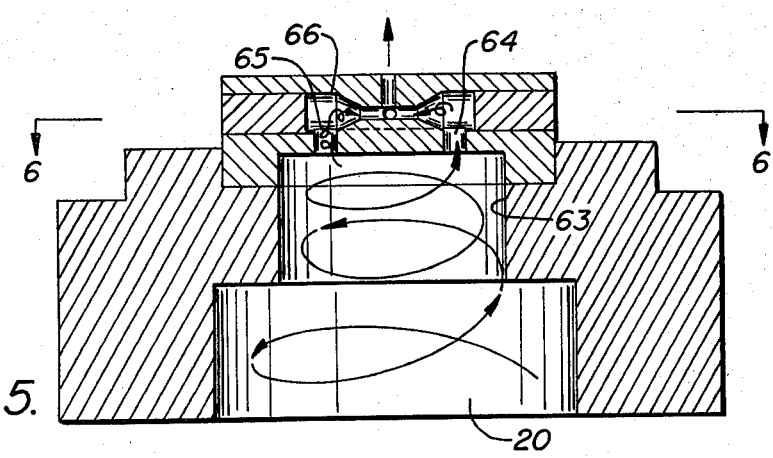
FIG._5.
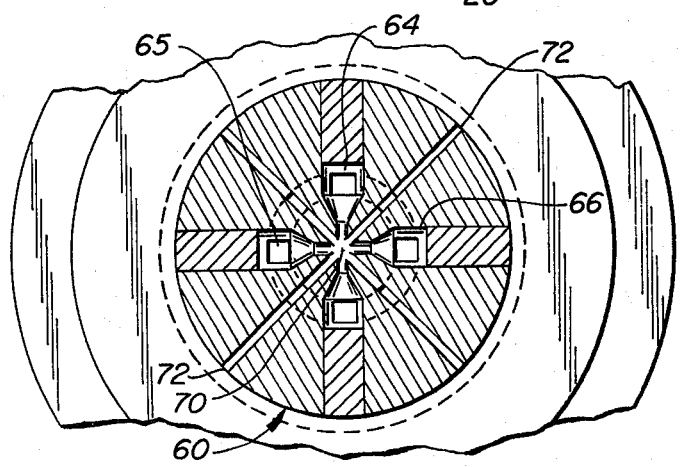
FIG._6.

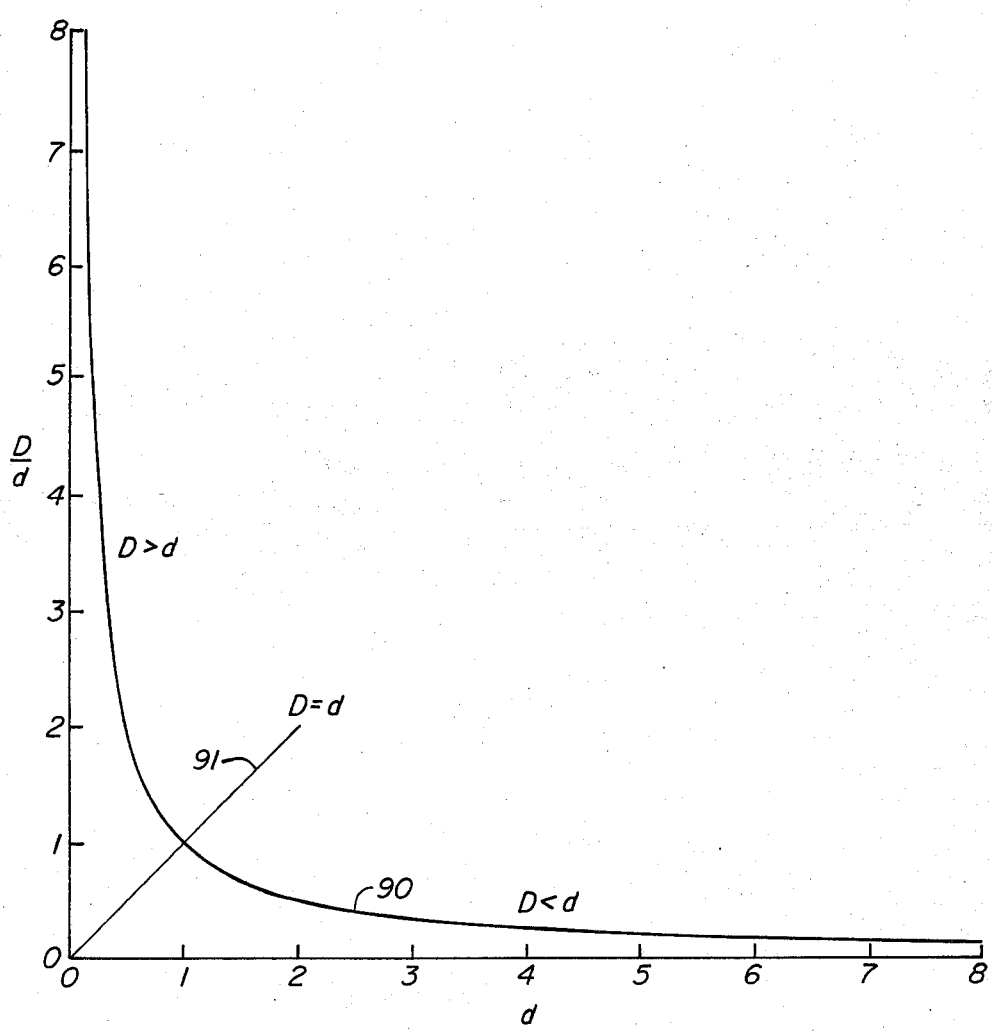
FIG._8.

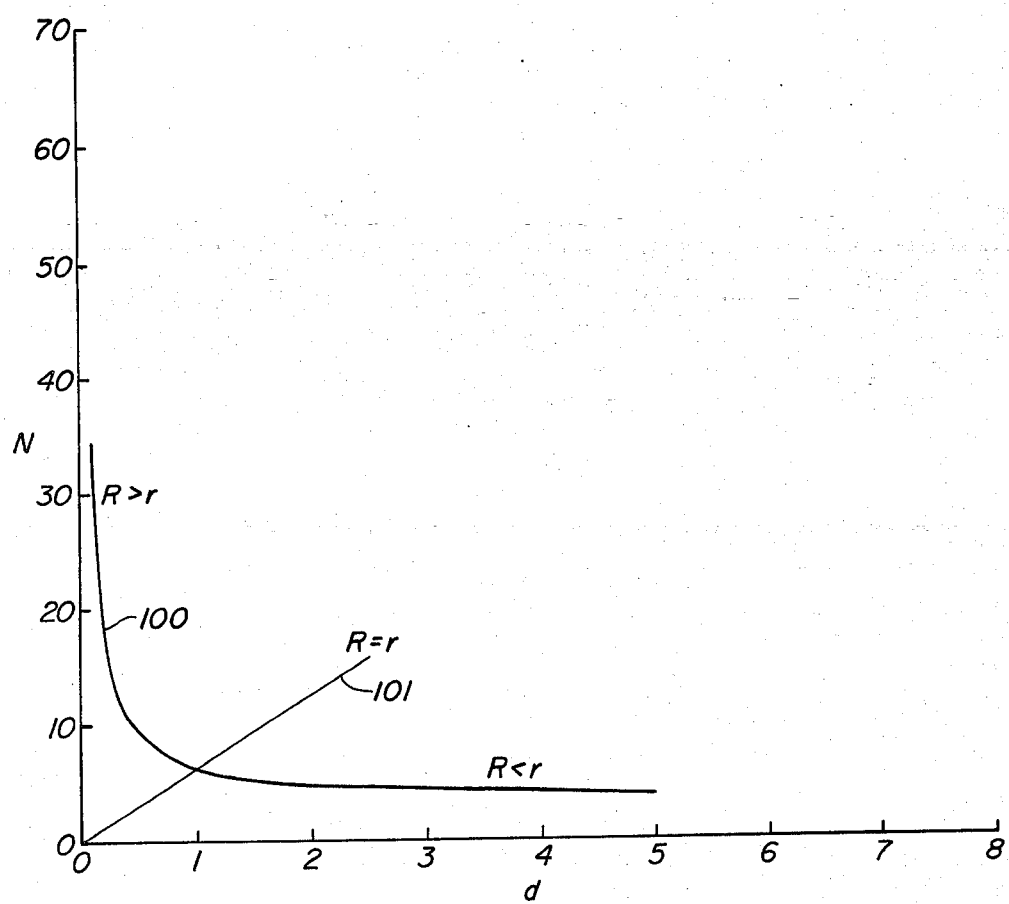
FIG._9.

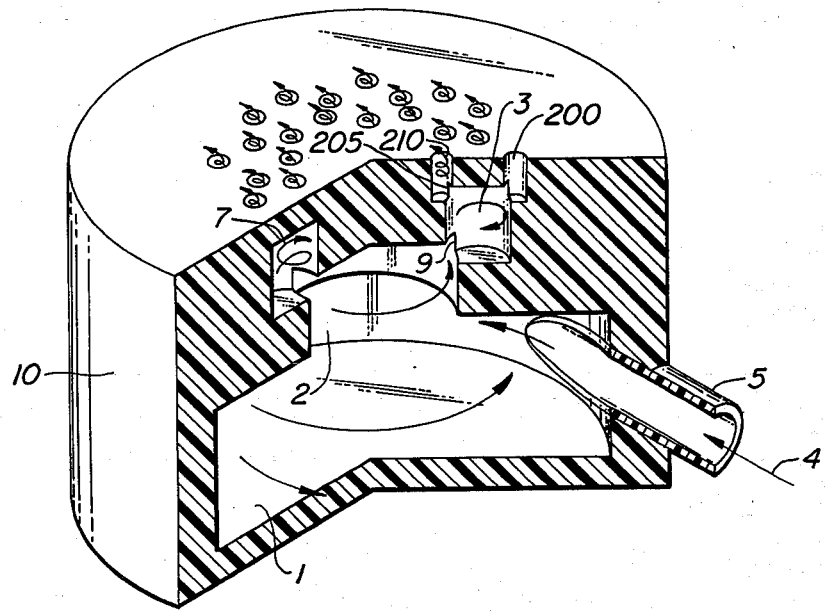
FIG._10.

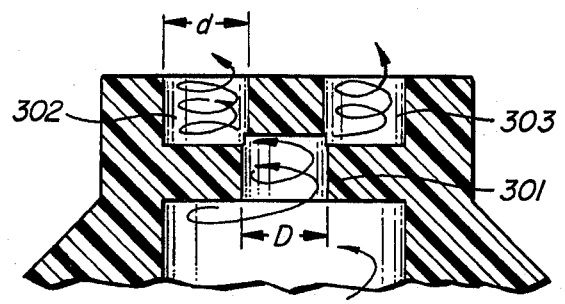
FIG.—11.
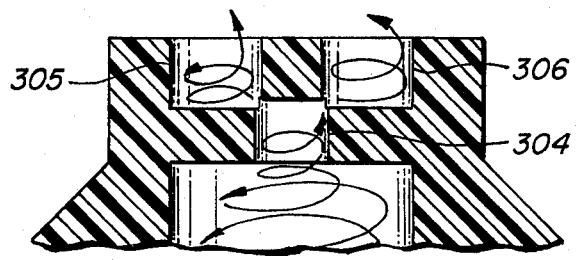
FIG.—12.
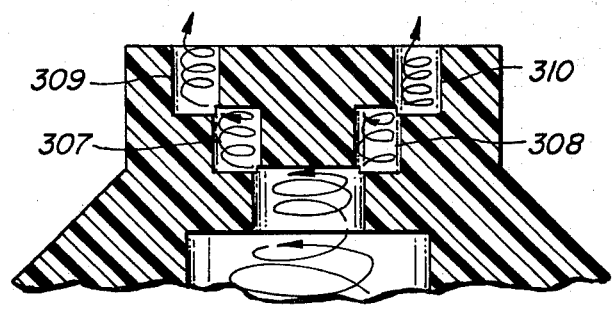
FIG.—13.
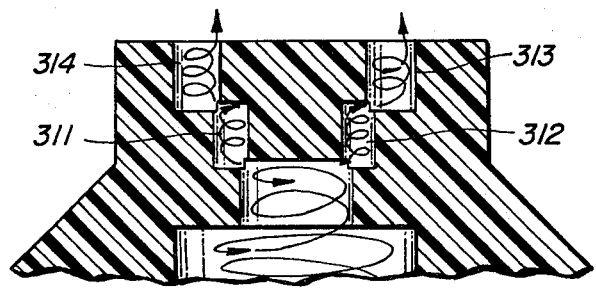
FIG.—14.

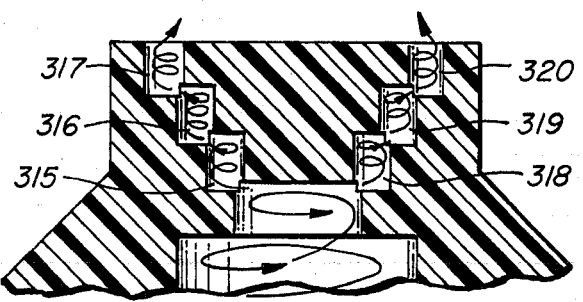
FIG._15.
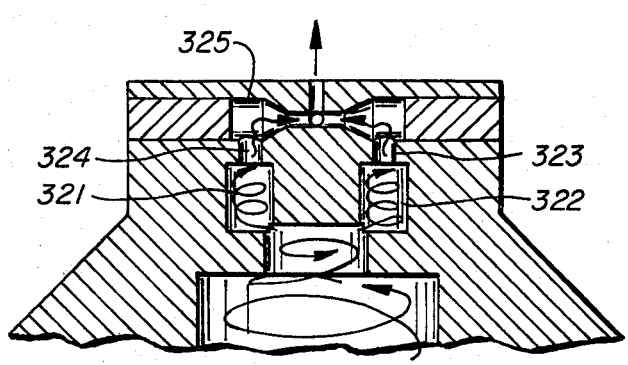
FIG._16.
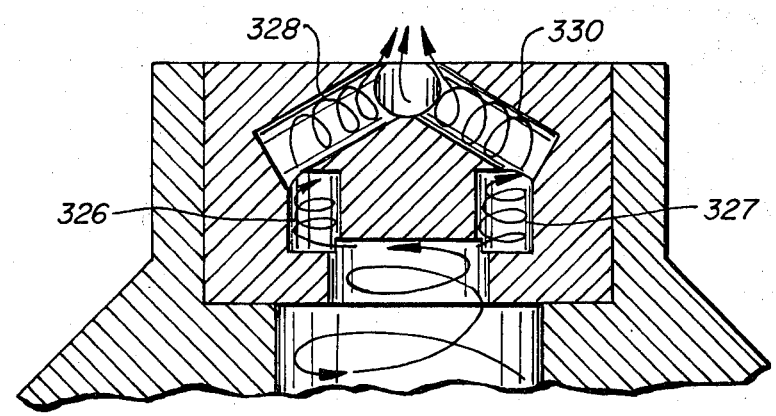
FIG._17.

HYPERBOLIC FREQUENCY MODULATION RELATED TO AERO/HYDRODYNAMIC FLOW SYSTEMS

RELATED APPLICATION

This application is a continuation-in-part of U.S. application Ser. No. 4,818, filed Jan. 19, 1979, now U.S. Pat. No. 4,253,508, entitled SELECTIVE FILTERING OF TOBACCO SMOKE BY ENHANCED FILTRATION EFFICIENCY.

BACKGROUND OF THE INVENTION

In The Journal of the Acoustical Society of America, Vol. 26, No. 1, January 1954, Vonnegut described a sonic device consisting of two coaxial cylindrical cavities. Either compressible or incompressible fluids, for example, air or water, respectively, were tangentially introduced into the larger cylindrical chamber producing an initial vortex. As the fluid entered the smaller chamber, it underwent an increase in angular velocity as the result of the conservation of angular momentum. Fluid in vortical motion in the first cylindrical cavity which passed into the second cavity produced an intense stable acoustical disturbance at the exit of the outlet cavity. Vonnegut discovered that the frequency of the disturbance exhibited roughly linear dependence upon the volume fluid flow rate or upon the square root of the pressure gradient of the fluid entering the first cavity. He empirically determined that the relationship between the frequency of the disturbance, the diameter of the exit orifice, and the pressure gradient could be expressed by the following equation:

$$f = \alpha \left(\frac{V_c}{\pi D}\right) \sqrt{\frac{P_1 - P_2}{P_1}} \qquad \text{(Eq. 1)}$$

where:
 f = frequency of the disturbance
 $V_c$ = speed of sound
 D = diameter of the exit orifice
 $P_1$ = entering pressure
 $P_2$ = exhaust pressure
 $\alpha$ = constant less than 1

Vonnegut concluded that his whistle structure amounted to nothing more than an amusing musical toy and, with further development, be concluded that it may be found to have some merit as a musical instrument.

Prior attempts have been made to increase the power output of a sonic whistle by various means. For example, in *Sources of High-Intensity Ultrasound*, Vol. 1, Plenum Press, New York, 1969, it is taught that with a decrease nozzle diameter and corresponding increase in frequency, the mass flow of a fluid diminishes which, in turn, diminishes the radiated power from a whistle structure. Various multi-whistle designs were then explored with the common problem that multi-whistle gas jets of low internal impedance suffer a disruption of air flow in individual whistles due to air flows of adjacent whistles. There was no disclosure concerning how this problem could be solved and the conclusion was reached that synchronization of whistles was not feasible.

It has been understood for quite some time that sound waves could be used, for example, to coagulate small, suspended particles in a fluid media. For example, in *Sonics*, John Wiley & Sons, Inc., New York, London, 1955, Hueter and Bolt discussed the effect of simple sonic energy on aerosol processing noting that a sound wave incident on a suspension of small particles in a medium will impart vibratory motion to the particles and that small particles will follow the vibration more readily than larger ones. This was taught to cause relative motion between large and small particles resulting in collisions and agglomeration. The source of ultrasonic waves employed by Hueter and Bolt was a powerful generator causing a thin diaphragm in a tank to vibrate.

It has also been taught that ultrasonic waves can be used to break up larger particles into smaller ones forming a stable dispersion. In *Ultrasonics*, Marcel Dekker, Inc., New York, 1973, pages 467-471, Ensminger disclosed the production of aerosols by ultrasonic means. Although the physical mechanisms at work in both the case of coagulation and dispersion or atomization are complex and not fully understood, two formulae can be gleaned from the literature which illustrates the relationship between particle size and optimum ultrasonic frequency for a given process. In general, for coagulation of particles with diameter d, in microns, $$\text{optimum frequency} = (89.6/\rho d^2) \times 10^3 \text{ Hz.}$$

where $\rho$ is in grams/cc.

For a dispersion of particles with diameter d, in microns, $$\text{optimum frequency} = (145/d) \times 10^6 \text{ Hz.}$$

It is apparent that at modest frequencies micron size particles may be coagulated into larger particles, but considerably higher frequencies are required to produce a dispersion of particles with 10-fold greater diameters. Before the present invention, ultrasonic devices to sonically disperse and coagulate particles in a fluid media have been costly and inefficient and often required electrical energy input. Although the prior art has discussed the abstract principles of sonically coagulating and dispersing suspended particles in a fluid, devices which could accomplish these phenomenon have found little practical application.

U.S. patent application Ser. No. 4,818, filed Jan. 19, 1979, now U.S. Pat. No. 4,253,508, discloses the device of the present invention for coagulation in a fluid media, and it has now been found that the sonic device disclosed as the present invention is capable of performing a wide range of fluid processing operations. Unlike any other sonic devices which have been disclosed heretofore, the device of the present invention presents an extremely low impedance to fluid flow and thus is ideally suited for fluid processing applications where either pure acoustic (sonic or ultrasonic) energy and/or controlled turbulence is desired. No other sonic device prior to the present invention has been capable of multiplying the frequency and power of fluid vortex vibration without significantly altering the impedance of the generator or using significantly higher input power. In addition, the device is found to have an inherent stability both in its fluid flow characteristics as well as in the sonic and ultrasonic wave frequencies it produces.

SUMMARY OF THE INVENTION

Broadly, the present invention can be characterized as a frequency modulator whereby the annular frequency and amplitude of the sound waves produced by the driving fluid are arbitrarily altered without substantially increasing the flow impedance of the system. The frequency modulator comprises a swirl chamber having a substantially circular cross-section and further having means for the feeding of a fluid to the interior of the swirl chamber in such a way as to cause it to rotate. It is in the swirl chamber that the vortex of the fluid is established. Coaxially aligned with the swirl chamber is a compression chamber also having a substantially circular cross-section disposed downstream of the swirl chamber wherein the compression chamber has a cross-section which is equal to or smaller than the cross-section of the swirl chamber. It is in the compression chamber that the angular frequency of the fluid is established and possibly increased as taught by Vonnegut in the description of his vortex whistle. The frequency modulator lastly possesses at least two modulator cavities which also have substantially circular cross-sections and which are disposed downstream of the compression chamber. The modulator cavities can be either smaller ($D>d$), equal to ($D=d$), or larger ($D<d$) in cross-section than the cross-section of the compression chamber (where D is the diameter of the compression chamber or exit orifice, Eq. 1, and d is the diameter of the frequency modulator cavities). When smaller, the angular frequency and amplitude of the waves produced by the driving fluid passing through the frequency modulator of the present invention are arbitrarily multiplied. When the cross-sections of the multiplier cavities and the compression chamber are of equal size, the frequency of the waves produced by the driving fluid would remain unaltered in passing through the modulator cavities but the amplitude of the waves would be changed depending upon the constructive or destructive interference established by fluid waves emanating from the modulator cavities. In that embodiment where the modulator cavities have larger cross-sections than the cross-section of the compression chamber, the frequency of the waves produced by the driving fluid is decreased while the amplitude of the waves can be arbitrarily altered depending, again, upon the constructive or destructive interference between the waves emanating from the modulator cavities. As will be explained further in this disclosure, the placement and attitude of the modulator cavities can be altered to thus control and modify the characteristics of the fluid output.

This invention will be more fully appreciated when viewing the appended drawings wherein:

FIG. 1 is a perspective view of a frequency modulator of the present invention;

FIG. 2 is a top view of the frequency modulator of FIG. 1 showing the vortical flow of fluid emanating from the multiplier cavities where $D>d$;

FIGS. 3A and 3B are expanded views of the fluid flow pattern at the entry of a typical modulator cavity of FIG. 1;

FIG. 4 is a plan view of a frequency modulator of the present invention;

FIG. 5 is a cross-section of a frequency modulator of the present invention having modified modulator cavity configuration resulting in orthokinetic interaction of fluid streams;

FIG. 6 is a cross-sectional view taken along line 6—6 of FIG. 5;

FIG. 7 is yet another frequency modulator of the present invention having a modified modulator cavity configuration resulting in semi-ortho and parakinetic interaction of fluid streams;

FIGS. 8 and 9 are graphical representations depicting the interrelationships in the geometries of the present invention; and FIG. 10 is a perspective view of a frequency modulator having a second row of modulator cavities.

FIG. 11 is a cross-section of a frequency modulator of the present invention having modulator cavities wherein $D=d$.

FIG. 12 is a cross-section of a frequency modulator of the present invention having modulator cavities wherein $D<d$.

FIG. 13 is a cross-section of a frequency modulator of the present invention having a second set of modulator cavities wherein the diameters of the second set of modulator cavities is substantially equal to the diameters of the first set of modulator cavities.

FIG. 14 is a cross-section of a frequency modulator of the present invention having a second set of modulator cavities wherein the diameters of the second set of modulator cavities are larger than the diameters of the first set of modulator cavities.

FIG. 15 is a cross-section of a frequency modulator having a third row of modulator cavities.

FIG. 16 is a cross-section of a frequency modulator of the present invention having a second set of modulator cavities whose configuration results in orthokinetic interaction of fluid streams.

FIG. 17 is a cross-section of a frequency modulator of the present invention having a second set of modulator cavities configured to result in semi-ortho and parakinetic interaction of fluid streams.

The frequency modulator is shown in FIG. 1 in one of its simplest forms. The swirl chamber 1 has a substantially circular cross-section and is the area where a fluid is caused to enter the device forming a vortex. In FIG. 1, a tangent input hole 5 is shown, although any means of feeding the fluid to the swirl chamber so that a vortex is established as schematically shown by arrows 4 is in keeping with practicing the present invention.

Coaxially aligned with the swirl chamber is compression chamber 2 which again has a substantially circular cross-section. The cross-section of the compression chamber is often smaller than that of the swirl chamber and thus serves to compress the vortex thereby increasing the angular velocity of the flow. On the downstream side of the compression chamber are at least two modulator cavities 3 also having substantially circular cross-sections which are in fluid communication with the compression chamber via ports which are tangential to the modulator cavities permitting the vortical flow in the compression chamber to be subdivided into individual vortices 7. As stated previously, when the cross-section of the modulator cavities are smaller than the compression chamber, the vortices created in the modulator cavities 3 will have increased angular velocity as for the law of conservation of angular momentum, although the direction of rotation will be opposite to that in the compression chamber 2 as shown by comparing directional fluid flow 4 with fluid flow 7 of FIG. 2. When the cross-section of the modulator cavities are equal to the cross-section of the compression chamber, there will be no increase in the frequency of the waves of the driving fluid, although the amplitude of the composite acoustic waves will depend upon the spatial relationship between the amplitude of the individual waves in the fluid emanating from each modulator cavity. When the cross-section of the modulator cavities are larger than the cross-section of the compression chamber, the frequency of the resultant waves will be less than the frequency of the waves within the compression chamber and the amplitude can be again be altered depending upon the spatial relationship between the waves emanating from each modulator cavity.

The overlapping walls of the compression chamber 2 and modulator cavities 3 intersect to define ports which are bounded by sharp knife edges 9 defined by the cavity walls of the compression chamber/modulator cavities. The knife edges 9 provide low loss momentum coupling between the compression chamber 2 and the modulator cavities 3, which, as best shown in FIGS. 3A and 3B, set up a reverse, high frequency vortex flow 25, causing modulator cavities 3 to resonate like organ pipes, in phase and with uniform intensity. Each resonating cavity, or resonator, produces a resulting disturbance which can be caused to constructively interfere with the remaining modulator cavities to produce a high energy field of much greater magnitude than that produced by a single resonating cavity.

It is quite evident that when one graphically plots the ratio of the unit diameter of the compression chamber (D) to the diameter of the modulator cavities (d) against the diameter of the modulator cavities (d), the graph is in the form of a hyperbola. Thus, $$(D/d)d = 1 \qquad \text{(Eq. 2)}$$

wherein
  $D$ = diameter of the compression chamber and also the diameter of the exit orifice as defined in Eq. 1.
  $d$ = diameter of the frequency modulator cavities.
  $(D/d)$ = frequency modulator ratio.

This relationship holds whether D is greater than, equal to, or smaller than d. It must be kept in mind, however, that when $D > d$, the frequency of the driving fluid is multiplied. When $D = d$, the frequency of the driving fluid is unaltered, while when $D < d$, the frequency of the driving fluid is attenuated. A graphical representation of this relationship is shown as FIG. 8 where the rationalized D has been arbitrarily selected as being 1 so that $(D/d)d = 1$.* It should be particularly noted that hyperbola 90 is intersected by 45° symmetry line 91 which represents those points where $D = d$, whereby all values to the left of line 91 are those where $D > d$ and, conversely, all values to the right of line 91 are those where $D < d$.

* For $D > d$ the frequency is multiplied (increased).
* For $D = d$ the frequency is unaltered.
* For $D < d$ the frequency is attenuated (decreased).

The geometry of the modulator cavities 3 can be selected to provide a number of in-phase radiating energy sources of uniform intensity. As taught by Olson in *Acoustical Engineering*, Van Nostrand Co., Inc. (1957), when the modulator cavities are configured in a ring, the energy radiating by such a configuration may be highly directional and can be described by the equation:

$$R_a = J_o [2\pi R/\lambda] \sin a \qquad \text{(Eq. 3)}$$

wherein
  $R_a$ = ratio for the pressure of an angle a to the pressure for an angle $a = 0$.
  $J_o$ = Bessel function of zero order
  $R$ = radius of the circle (cm)
  $a$ = angle between the axis of the circle and the line adjoining the point of observation in the center of the circle.
  $\lambda$ = wave length of the radiation.

As stated, the above equation defines the directional characteristics of a circular-ring vibratory radiating energy source of uniform strength in the same phase at all points on the ring. A ring of four modulator cavities 3 (where $D > d$) is shown in FIG. 4 in fluid communication with compression chamber 2. Note that in this embodiment, the cross-section of the compression chamber is equal to the cross-section of the swirl chamber.

The frequency modulator of the present invention can be used to produce an acoustic field of constant, ultrasonic frequency. As stated in copending application Ser. No. 57,394, by controlling the pressure and thus volume flow rate of the fluid passing through the frequency modulator and by properly selecting the relative dimensions of the compression chamber and modulator cavities, liquids can be atomized into substantially uniform micron-size droplets.

Additional applications can be made of the device of the present invention by taking advantage of the effects of pure ultrasonic energy which occurs outside of the frequency modulator and the effects of controlled turbulence within the device. For example, production of solid/liquid and gas/liquid dispersions, liquid/liquid emulsions and liquid/gas aerosols as well as simple mixing and homogenization operations are greatly enhanced. As described in copending application Ser. No. 4,818, now U.S. Pat. No. 4,253,508, coagulation and flocculation of smoke, fogs, aerosols and particles suspended in air is dramatically enhanced and the device of the present invention could also be employed to perform similar functions in liquids. The frequency modulator is capable of carrying out deemulsification operations, producing uniform liquid aerosols and enhancing the coating of surfaces with suspended particles.

The present invention can also be used for heat transfer enhancement by disruption of the liquid or gas layer adjacent to the heat transfer surface. Liquid diffusion rates can be increased through porous media including membranes, filters and rock. Catalytic effects can be improved due to molecular breakdown, production of free ions, mixing and other effects. For example, when activated charcoal is placed downstream of a frequency modulator within a cigarette filter, the activated charcoal can be caused to absorb more of the cigarette residue for the charcoal is made to vibrate allowing its porous structure to become more receptive to the particulate cigarette residue. This phenomenon is known as "super activation" of the charcoal. The present invention can also be used to alter the solubility of various components and thus precipitate various dissolved materials and crystallize solids.

FIGS. 1 and 2 display that embodiment of the present invention wherein $D > d$ and wherein the modulator cavities are substantially paraxially aligned with the axis of the compression chamber. In this case the fluid streams exiting the modulator cavities are parakinetic. When the modulator cavities are arranged as shown in a ring coaxial with the compression chamber, the ultrasonic field generated will have a maximum amplitude at a point on the axis of the frequency modulator near its exit surface. Such a configuration would be useful in coagulating particles in a cigarette filter. However, in carrying out various processing functions as outlined above, it is at times advantageous to provide for a frequency modulator where the output from the modulator cavities interfere to provide wave fields of various configurations above the frequency modulator.

FIGS. 5 and 6 display a frequency modulator including swirl chamber 20 and compression chamber 63, which is, as with the previously described embodiment, coaxially aligned with the swirl chamber having a substantially circular cross-section which is smaller than or equal to the cross-section of the swirl chamber. In this embodiment, however, the modulator cavities are arranged perpendicularly to the axis of the compression chamber and communicate with the compression chamber by annular trepanning 64. Pairs of modulator cavities are coincident such that their flows are discharged along a head-on collision course to produce an orthokinetic interaction. This type of interaction provides, for example, more favorable conditions for superatomization.

Referring more specifically to FIGS. 5 and 6, a vortex is initially formed in swirl chamber 20 which is intensified in compression chamber 63. The fluid then enters trepanning 64 which communicates with a pair of cylindrically shaped cavities 66 whose axes lie in a radial plane. The fluid communicates between annular trepanning 64 and cylindrical cavity 66 via ports 65 being defined by sharp edges which effect a directional change in the vortical flow similar to sharp edge 9 shown in FIGS. 3A and 3B. In this case both the orthokinetic momentum transfer occurring between the intersecting fluid flows and the constructive interference of the ultrasonic waves produced at the cavity exits result in an intense focusing of dispersive energy in the emerging fluid. Despite the proximity of the parakinetically intersecting flows from adjacent cavities, the fluid flow from an individual cavity is inherently stable due to its vortex motion which allows the fluid momentum to be effectively concentrated to atomize the fluid. Both the high frequency and the uniformity of the flow insure favorable physical condition for droplet size and uniformity of vapor phase constituents.

It has also been found advantageous to construct a frequency modulator where the discharge from each modulator cavity may intersect at various angles. The angle of intersection will affect both the sonic wave interference patterns which may be produced in the vicinity of the frequency modulator to disperse the fluid stream as well as the net momentum of the exiting fluid. When the frequency modulator is used to disperse a liquid in defined droplets, this angle, along with the placement of the exit cavities, will determine the geometry of the spray pattern. Reference is made to FIG. 7 which shows the establishment of an initial vortex in swirl chamber 75 which is intensified in compression chamber 81, which has a smaller substantially circular cross-section than that of the swirl chamber to increase the angular momentum of the fluid. The compression chamber and swirl chamber are in substantial coaxial alignment, however, the axis of the modulator cavities 82 are oriented at an angle with respect to the axis of the compression chamber, the particular angle selected to generate the most favorable spray pattern for a given application. Cavities 82 intersect the wall of the compression chamber 81 defining a series of ports 84 through which the flow in the chamber 81 is discharged. At the point where the walls of the cavities and the wall of the compression chamber intersect, sharp edges 86 are defined which provide the sharp edged coupling between the compression chamber and multiplier cavities. This structure produces both a focusing of sonic energy at the intersection of the axes of the resonating cavities as well as a net upward momentum in the intersection of the three flow streams due to the semi-orthokinetic interaction of the streams.

As stated previously, the present invention further contemplates configurations wherein the cross-sections of the modulator cavities can be equal to or greater than the cross-sections of the compression chamber. Reference is made to FIGS. 11 and 12 wherein modulator cavities 302, 303 are shown to be of equal cross-section to compression chamber 301, while modulator cavities 305, 306 are shown larger in cross-section than compression chamber 304.

Similarly, when multiple layers of modulator cavities are employed, such as shown in FIGS. 13 and 14, the modulator cavities can not only decrease in cross-section as one progresses down a fluid stream such as shown in FIG. 10 but also the second series of modulator cavities 309, 310 can be equal in cross-section to the first set of modulator cavities 307, 308 or the second set of modulator cavities 313, 314 can be larger in cross-section than the prior set of modulator cavities 311, 312. When the diameters of the downstream modulator cavities are equal to the diameters of the upstream modulator cavities, the frequency of the driving fluid between modulator cavities is unaltered, while when the downstream modulator cavities are larger in cross-section, the frequency of the driving fluid is attenuated.

FIG. 10 shows a perspective view of a frequency modulator of the present invention having two sets of modulator cavities. However, any number of sets of such cavities can be employed and a cross-sectional view of a frequency modulator having three sets of such cavities, namely, 315–320, is shown in FIG. 15. Note that in each instance, the overlapping walls of the modulator cavities intersect at the fine ports which are bounded by sharp knife edges defined by the cavity walls of the modulator cavities themselves.

FIG. 5 which was previously discussed depicts an embodiment of the present invention for producing orthokinetic interaction between fluid streams. FIG. 5 shows one embodiment wherein trepanning 64 communicates directly with the compression chamber in order to discharge the fluid flow along a head-on collision course. However, as shown in FIG. 16, trepanning 323, 324 can communicate instead with modulator cavities 321, 322. As the fluid enters trepanning 323, 324 it is caused to communicate with a pair of cylindrically shaped cavities 325 whose axes lie in a radial plane.

In FIG. 7, yet another embodiment of the present invention was depicted wherein the discharge from each modulator cavity was caused to intersect at various angles whereby the angle of intersection affects both the sonic wave interference patterns as well as the net momentum of the exiting fluid. As is shown in FIG. 17, modulator cavities 328, 330 which are oriented at an angle with respect to the axis of the compression chamber can be sharp-edge coupled to upstream modulator cavities 326, 327 as yet another embodiment of the present invention. The structure shown in FIG. 17, as the structure shown in FIG. 7, produces a focusing of sonic energy at the intersection of the axes of the resonating cavities, as well as a net upward momentum in the intersection of the fluid streams due to the semi-orthokinetic interaction of the streams. The streams exiting the frequency modulator of FIG. 17 has the further advantage of frequency and amplitude alteration due to upstream modulator cavities 326, 327 which are in turn sharp-edge coupled to the upstream compression chamber.

Although only three embodiments of the present invention have been illustrated, the invention contemplates virtually any bias angle between modulator cavities and the axis of the vortex multiplier. For example, in *Acoustic Coagulation and Precipitation of Aerosols*, Consultants Bureau, New York, 1965, Mednikov hypothesized that the output from a vortex whistle produces practically no radiation along the axis of the whistle. Considering each modulator cavity to display the acoustic characteristics of a vortex whistle, Mednikov's hypothesis would dictate that paraxially aligned modulator cavities such as shown in FIGS. 1 and 2 would produce most optimum constructive interference at the radial center of the frequency modulator only at a point near the surface of the frequency modulator. In order to achieve optimum constructive interference all along the axis of the frequency modulator, it would be necessary to angle each modulator cavity so that the upstream ends of the cavities are radially closer together than the downstream or output ends of the cavities. Although not illustrated, such a configuration is intended to be embraced by the present invention as is virtually any other modulator cavity orientation.

The present invention further contemplates additional sets of modulator cavities also having substantially circular cross-sections which are disposed downstream of the first set of modulator cavities. As shown in FIG. 10, ideally, the second set of modulator cavities 200 would peripherally intersect the first set of modulator cavities 3 by ports 205 which are defined by substantially sharp edges. There is virtually no definable limit to the number of modulator cavity sets which are capable of being used in practicing the present invention or the angles their axes might have relative to that of the central compression chamber. If succeeding layers of modulator cavities have smaller cross-sections, as more modulator cavity sets are used, the fluid in vortical flow would be characterized by greatly increased frequency and amplitude. In such a configuration, fluid pressure through the frequency modulator would increase as additional layers of modulator cavities were used.

Under many processing conditions, it is often times desirable to maximize the intensity of the resultant wave amplitude from the composite fluid exiting the modulator cavities. The maximum number of modulator cavities which can be placed about the circumference of the compression chamber in a single row so that the modulator cavities communicate with the compression chamber by ports tangential to the modulator cavities can be represented by the following equation:

$$N = \pi(R+r)/r \qquad (Eq. 4)$$

wherein
N = maximum number of modulator cavities
R = the radius of the compression chamber
r = radius of the modulator cavities In such a configuration, the intensity of the resultant wave where there is constructive interference of the waves of the fluid exiting each modulator cavity can be represented by the following equation:

$$I \alpha (\Sigma a_n)^n \qquad (Eq. 5)$$

wherein
I = intensity of the resultant wave
$a_n$ = the amplitude of each individual wave exiting the modulator cavity
n = from 2 to $\pi(R+r)/r$ modulator cavities FIG. 9 shows the relationship between N, the maximum number of modulator cavities when plotted against d. The curve 100 takes on the attributes of a hyperbola, although there is some deviation from the true hyperbolic curve. Line 101 represents a mathematical relationship when R, the radius of the compression chamber, equals r, the radius of the modulator cavities. Those points on curve 100 to the left of 101 show those instances where R is greater than r, while the portion of curve 100 to the right of 101 shows the relationship where R is less than r.

Of course, the above discussion assumes that the amplitude of the individual waves emanating from each modulator cavity are in phase. As the previous disclosure makes quite clear, the present invention contemplates various frequency modulator configurations where the waves emanating from each modulator cavity can be partially or completely out-of-phase with corresponding waves emanating from the remaining cavity or cavities. The resultant amplitude from the simplest form of the present invention, that is, a frequency modulator having only two modulator cavities resulting in the emanation of two fluid waves in simple harmonic motion can be represented by the following:

$$A = a_1^2 + a_2^2 + 2(a_1 a_2)\cos(Q_2 - Q_1) \qquad (Eq. 6)$$

wherein
A = the resultant amplitude
$a_1$ = amplitude of first wave
$a_2$ = amplitude of second wave
$Q_1$ = phase constant of first wave
$Q_2$ = phase constant of second wave It is quite obvious that when the amplitudes of the waves are equal and the phase difference is an integral multiple of $2\pi$, the intensity of the resultant wave is proportional to four times the square of the amplitude of either wave, and when the phase difference is an odd integral multiple of $\pi$, the intensity is zero. For a further discussion of these principles, reference is made to *Introduction to Geometrical and Physical Optics*, McGraw-Hill Book Co., Inc., (1953), pp. 177 et seq.

EXAMPLE

A frequency modulator of a configuration as shown as FIG. 3 of U.S. application Ser. No. 4,818 now U.S. Pat. No. 4,253,508, was placed at the distal end of a Kentucky Reference Standard Cigarette, Code No. 1-R-1. The frequency modulator had a compression chamber diameter of 0.045 inches, four modulator cavities each having a diameter of 0.025 inches with a modulator cavity depth of 0.035 inches. The overall distance between the radial center of the compression chamber and each modulator cavity periphery was measured to be 0.020 inches.

The frequency modulator was placed between the cigarette and a standard cigarette impingement filter. The cigarette smoke was drawn from the cigarette through the filter and collected in a 0.45 micron millipore filter paper, which collects particles greater than 0.5 microns at a flow rate of 4 liters per minute. The weight of particulate matter was measured from (1)

seven cigarettes possessing only an ordinary impingement filter, (2) seven cigarettes which included the impingement filter downstream of a frequency modulator and (3) a group of seven cigarettes having in addition to a frequency modulator and impingement filter, a charge of activated charcoal. The millipore filter papers were subjected to gravimetric analysis which was confirmed by absorbance measurements of ethanol extracts of the filter papers. Final confirmation was obtained by solvent extraction of the cotton cigarette impingement filters.

It was determined that 5.0 milligrams of particulate matter passed through seven of the filtered cigarettes, while only approximately 1.4 milligrams of particulate matter passed through the identical seven filtered cigarettes, which further contained the frequency modulator of the present invention placed upstream of the impingement filter. When a charge of activated charcoal was used in addition to the impingement filter and frequency modulator, only 0.7 milligrams of particulate matter was collected.

The present invention represents a useful processing tool whether or not it is the desire to generate a sonic field. The frequency modulator is capable of acting as a frequency multiplier for generating the necessary spectrum of ultrasonic frequencies and an amplitude amplifier for imparting sufficient vibrational energy to, for example, various aerosols and smoke to cause coagulation of particles. Mednikov, in *Acoustic Coagulation and Precipitation of Aerosols,* supra, at p. 141, discusses the use of sonic energy for artificial precipitation of clouds to produce rainfall and to remove $SO_2$ from air. The separation of gas mixtures using sonics is further mentioned in *Ultrasonics in the Chemical Industry,* Soviet Progress in Applied Ultrasonics, Vol. 2 Nosov (1965).

Amplitude amplification takes place by constructively interfering a number of in-phase resonating sources of uniform strength to produce a resulting force field whose intensity is several times that of the individual sources. By appropriately choosing the geometry of the sonic generators, the sonic energy is focused into a relatively small region in the flow to make the most efficient use of the available energy. Moreover, the frequency modulator can be used to produce turbulence in flow. The production of turbulence without sonic energy is most advantageous when various mixing operations are being carried out with the frequency modulator.

Although particular embodiments of the invention have been illustrated in the drawings and described herein, it will be understood that the invention is not limited to the embodiments disclosed, but is capable of re-arrangement, modification and substitution of parts and elements without departing from the spirit of the invention.

What is claimed is:

1. A frequency modulator comprising:

(a) a swirl chamber having a substantially circular cross-section and further having means for the feeding of a fluid to the interior of the swirl chamber to impart a rotational motion to the fluid;

(b) a compression chamber also having a substantially circular cross-section disposed downstream of the swirl chamber and in substantially coaxial alignment therewith wherein said compression chamber has a cross-section which is equal to or smaller than the cross-section of said swirl chamber; and (c) at least two modulator cavities also having substantially circular cross-sections which are in fluid communication with and disposed downstream of said compression chamber and which communicate with the compression chamber by ports tangential to the modulator cavities.

2. The frequency modulator of claim 1 wherein the cross-sections of the modulator cavities are smaller than the cross-section of the compression chamber.

3. The frequency modulator of claim 1 wherein the cross-sections of the modulator cavities are substantially equal to the cross-section of the compression chamber.

4. The frequency modulator of claim 1 wherein the cross-sections of the modulator cavities are larger than the cross-section of the compression chamber.

5. The frequency modulator of claim 1 wherein said compression chamber is substantially open to fluid flow at its upstream end and substantially restricted to fluid flow at its downstream end, said downstream end being peripherally intersected by said modulator cavities.

6. The frequency modulator of claim 1 wherein said modulator cavities are arranged in a ring coaxial with the compression chamber.

7. The frequency modulator of claim 1 wherein said modulator cavities are paraxially aligned with the axis of the compression chamber.

8. The frequency modulator of claim 1 wherein said modulator cavities are perpendicularly aligned to the axis of the compression chamber.

9. The frequency modulator of claim 1 wherein said modulator cavities are obliquely aligned to the axis of the compression chamber at a common angle thereto.

10. The frequency modulator of claim 1 wherein said ports are defined by substantially sharp edges.

11. The frequency modulator of claim 1 wherein said modulator cavities are geometrically arranged so that any acoustic waves are in phase when exiting each of said modulator cavities.

12. The frequency modulator of claim 1 wherein said means for feeding a fluid comprises a tangential opening in the side wall of the swirl chamber.

13. The frequency modulator of claim 1 wherein axes of the modulator cavities are biased with respect to the axis of the compression chamber so that acoustic waves exiting each modulator cavity most optimally constructively interferes with the acoustic waves exiting the other modulator cavities substantially along the radial center of the frequency modulator.

14. The frequency modulator of claim 1 wherein axes of the modulator cavities are biased with respect to the axis of the compression chamber so that fluid exiting each modulator cavity interacts orthokinetically with the fluid exiting the other modulator cavities.

15. The frequency modulator of claim 1 wherein axes of the modulator cavities are biased with respect to the axis of the compression chamber so that fluid exiting each modulator cavity interacts parakinetically with the fluid exiting the other modulator cavities.

16. The frequency modulator of claim 1 wherein axes of the modulator cavities are biased with respect to the axis of the compression chamber so that fluid exiting each modulator cavity interacts semi-orthokinetically with the fluid exiting the other modulator cavities.

17. The frequency modulator of claim 1 wherein said modulator cavities are arranged in a ring which is coaxial with the compression chamber and which peripherally intersect the outer wall of the compression chamber to define a series of ports through which fluid may be discharged.

18. A frequency modulator comprising:
   (a) a swirl chamber having a substantially circular cross-section into which a fluid under pressure is introduced to produce a vortical flow;
   (b) a compression chamber also having a substantially circular cross-section disposed downstream of the swirl chamber and in substantially coaxial alignment therewith wherein said compression chamber has a cross-section which is equal to or smaller than the cross-section of said swirl chamber so that the fluid entering the compression chamber intensifies in vortical flow; and
   (c) at least two modulator cavities also having substantial circular cross-sections which are each smaller than the cross-section of said compression chamber and which are disposed downstream of the compression chamber whereby the modulator cavities communicate with the compression chamber by means of a series of ports in the compression chamber tangential to the modulator cavities through which the vortical flow in the compression chamber may be discharged into each modulator cavity.

19. The frequency modulator of claim 18 wherein the axes of said modulator cavities are biased with respect to the axis of the compression chamber so that acoustic waves exiting from each modulator cavity most optimally constructively interferes with the acoustic waves exiting the remaining modulator cavities substantially along the radial center of the frequency modulator.

20. The frequency modulator of claims 1 or 18 further comprising a second set of modulator cavities having substantially circular cross-sections which are in fluid communication with and are disposed downstream of said previously recited modulator cavities and which communicate with the first set of modulator cavities by ports tangential to the second set of modulator cavities.

21. The frequency modulator of claim 20 wherein the cross-sections of the second set of modulator cavities are smaller than the cross-sections of the first set of modulator cavities.

22. The frequency modulator of claim 20 wherein the cross-sections of the second set of modulator cavities are substantially equal to the cross-sections of the first set of modulator cavities.

23. The frequency modulator of claim 20 wherein the cross-sections of the second set of modulator cavities are larger than the cross-sections of the first set of modulator cavities.

24. The frequency modulator of claim 20 wherein said second set of modulator cavities peripherally intersect said previously recited modulator cavities forming ports which are defined by substantially sharp edges.

25. The frequency modulator of claim 20 further comprising additional sets of modulator cavities serially located downstream of said second set of modulator cavities wherein each of the downstream modulator cavities has a substantially circular cross-section which is serially smaller than the cross-section of the preceding modulator cavities.

26. The frequency modulator of claim 20 wherein axes of the second set of modulator cavities are biased with respect to the axis of the compression chamber so that fluid exiting each second set modulator cavity interacts orthokinetically with the fluid exiting the other second set modulator cavities.

27. The frequency modulator of claim 20 wherein axes of the second set of modulator cavities are biased with respect to the axis of the compression chamber so that fluid exiting each second set modulator cavity interacts parakinetically with the fluid exiting the other second set modulator cavities.

28. The frequency modulator of claim 20 wherein axes of the second set of modulator cavities are biased with respect to the axis of the compression chamber so that fluid exiting each second set modulator cavity interacts semi-orthokinetically with the fluid exiting the other second set modulator cavities.

* * * * *